United States Patent [19]
Markham et al.

[11] Patent Number: 5,288,397
[45] Date of Patent: Feb. 22, 1994

[54] BAFFLED FCC REGENERATION PROCESS AND APPARATUS

[75] Inventors: Catherine L. Markham; Gregory P. Muldowney, both of Glen Mills, Pa.

[73] Assignee: Mobil Oil Corporation, Fairfax, Va.

[21] Appl. No.: 946,707

[22] Filed: Sep. 18, 1992

[51] Int. Cl.$^5$ ............................................. C10G 11/18
[52] U.S. Cl. ................... 208/113; 208/152; 208/153; 502/41; 502/42
[58] Field of Search ............ 208/113, 254 R; 502/42, 502/41

[56] References Cited

U.S. PATENT DOCUMENTS

| | | | |
|---|---|---|---|
| 4,036,779 | 7/1977 | Schatz et al. | 208/164 |
| 4,606,814 | 8/1986 | Haddad et al. | 208/161 |
| 4,994,424 | 2/1991 | Leib et al. | 502/41 |
| 5,021,146 | 6/1991 | Chin | 208/113 |
| 5,062,945 | 11/1991 | Pappal et al. | 208/150 |
| 5,198,397 | 3/1993 | Raterman | 208/164 |

Primary Examiner—Anthony McFarlane
Attorney, Agent, or Firm—Alexander J. McKillop; Malcolm D. Keen; Richard D. Stone

[57] ABSTRACT

A process and apparatus for dense phase, at least partially co-current, fluidized bed regeneration of FCC catalyst are disclosed. Catalyst regeneration occurs in a dense phase fluidized bed, with catalyst flowing laterally from a spent catalyst inlet to a regenerated catalyst outlet. Regeneration air flows up through the dense bed into a dilute phase region defined at the base by the dense phase bed and at the top by a horizontal baffle. The plate has openings or baffles forcing the dilute phase, consisting of entrained catalyst and flue gas, to flow horizontally in the same direction as the lateral flow of catalyst in the dense bed. Concurrent flow of at least the dilute phase material and the dense bed material improves regeneration and can reduce NOx emissions.

18 Claims, 3 Drawing Sheets

BAFFLED FCC REGENERATION PROCESS AND APPARATUS

BACKGROUND OF THE INVENTION

1. FIELD OF THE INVENTION

The invention relates to regeneration of catalytic cracking catalyst.

2. DESCRIPTION OF RELATED ART

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425C–600C, usually 460C–560C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen containing gas, usually air. Coke burns off, restoring catalyst activity and simultaneously heating the catalyst to, e.g., 500C–900C, usually 600C–750C. Flue gas formed by burning coke in the regenerator may be treated for removal of particulates and for conversion of carbon monoxide, after which the flue gas is normally discharged into the atmosphere.

Most older FCC units regenerate the spent catalyst in a single dense phase fluidized bed of catalyst. Although there are myriad individual variations, typical designs are shown in U.S. Pat. No. 3,849,291 (Owen) and U.S. Pat. No. 3,894,934 (Owen et al), and U.S. Pat. No. 4,368,114 (Chester et at.) which are incorporated herein by reference.

Most new units are of the High Efficiency Regenerator (H.E.R.) design using a coke combustor, a dilute phase transport riser, and a second dense bed, with recycle of some hot, regenerated catalyst from the second dense bed to the coke combustor. Units of this type are shown in U.S. Pat. No. 3,926,778 (which is incorporated by reference) and many other recent patents. The H.E.R. design is used in many new units because it operates with less catalyst inventory (and hence less catalyst loss and lower catalyst makeup), and tends to have both less CO emissions and less $NO_x$ emissions than the single dense bed regenerators.

Unfortunately, it has not been economically justifiable to convert older style, single dense bed regenerators to the modern H.E.R. design because of the high capital cost associated with simply scrapping the old single bed regenerator. Attempts to use the old regenerator as part of a modern two stage, H.E.R. design have not been too successful, as the old single stage units are larger than either of the beds in an H.E.R. unit.

Rather than scrap older FCC regenerators, refiners have tried to solve some of the problems associated with such units. Poor flow patterns and stagnant regions are problems in themselves, and make worse the $NO_x$ problems associated with bubbling dense bed regenerators. Attempts to improve flow patterns in bubbling dense bed regenerators, and generic attempts to deal with NOX emissions in any type of FCC regenerator will be reviewed below.

Stagnant Regions

In addition to doing a poor job of contacting bubbles of regeneration gas with fluidized solids, most FCC bubbling bed regenerators do a poor job of moving catalyst from inlet to outlet. In many FCC bubbling bed regenerators much or most of the bed is relatively stagnant. Much of the entering spent catalyst bypasses large regions of the bubbling fluidized bed. Stagnant regions have highly oxidizing atmospheres, leading to formation of large amounts of $NO_x$, from minor amounts of coke regenerated in such stagnant regions. Bypassing of spent catalyst through much of the bed makes it necessary to operate with much higher levels of oxygen than desired, to ensure that enough coke is burned from spent catalyst on its relatively brief passage through the regenerator.

Refiners have long known about this problem. U.S. Pat. No. 3,904,548 Penick, taught adding a baffle to a swirl type regenerator to minimize bypassing of spent catalyst.

U.S. Pat. Nos. 4,980,004 and 4,994,424 and 5,062,944, Leib and Sapre, which are incorporated by reference, added strategically placed baffles within the dense phase bed or used multiple catalyst inlets or outlets to make more of the catalyst bed active. Such modifications will improve catalyst flow patterns in bubbling bed regenerators, but are not the complete solution.

$NO_x$ Emissions $NO_x$, or oxides of nitrogen, in flue gas streams from FCC regenerators operating in complete CO burn mode is a pervasive problem in all regenerators, but especially severe in bubbling dense bed regenerators.

FCC units process heavy feeds containing nitrogen compounds, and much of this material is eventually converted into $NO_x$ emissions. There may be some nitrogen fixation, or conversion of nitrogen in regenerator air to $NO_x$, but most of the $NO_x$ in the regenerator flue gas is believed to come from oxidation of nitrogen compounds in the feed.

Several powerful ways have been developed to deal with the problem. The approaches fall into roughly five categories:

1. Feed hydrotreating, to keep NOx precursors from the FCC unit.
2. Segregated cracking of fresh feed.
3. Process approaches which reduce the amount of $NO_x$ formed in a regenerator via regenerator modifications.
4. Catalytic approaches, using a catalyst or additive which is compatible with the FCC reactor, which suppress NOx formation or catalyze its reduction.
5. Stack gas cleanup methods which are isolated from the FCC process.

Feed Hydrotreating

Some refiners now go to the expense of hydrotreating feed. This is usually done to meet sulfur specifications in various cracked products, a $SO_x$ limitation in regenerator flue gas, or improve feed crackability rather than comply with a $NO_x$ limitation. Hydrotreating removes some nitrogen compounds from FCC feed, and this reduces $NO_x$ emissions from the regenerator.

Segregated Feed Cracking

U.S. Pat. No. 4,985,133, Sapre et al, incorporated by reference, taught that refiners processing multiple feeds could reduce $NO_x$ emissions, and improve performance in the cracking reactor, by keeping high and low nitrogen feeds segregated, and adding them to different elevations in the FCC riser.

Process Approaches to $NO_x$ Control

Process modifications are suggested in U.S. Pat. Nos. 4,413,573 and 4,325,833 directed to two-and three-stage FCC regenerators, which reduce $NO_x$ emissions.

U.S. Pat. No. 4,313,848 teaches countercurrent regeneration of spent FCC catalyst, without backmixing, to minimize $NO_x$ emissions.

U.S. Pat. No. 4,309,309 teaches the addition of a vaporizable fuel to the upper portion of a FCC regenerator to minimize $NO_x$ emissions. Oxides of nitrogen formed in the lower portion of the regenerator are reduced in the reducing atmosphere generated by burning fuel in the upper portion of the regenerator.

U.S. Pat. No. 4,542,114 taught minimizing the volume of flue gas by using oxygen rather than air in the FCC regenerator, with consequent reduction in the amount of flue gas produced.

In Green et al, U.S. Pat. No. 4,828,680, incorporated herein by reference, the level of $NO_x$ emissions from a FCC unit was reduced by incorporating carbonaceous particles such as sponge coke or coal into the circulating inventory of cracking catalyst. The carbonaceous particle performed several functions, selectively absorbing metal contaminants in the feed and also reducing $NO_x$ emissions in certain instances. Many refiners are reluctant to add coal or coke to their FCC units, and such carbonaceous materials will also burn, and increase the heat release in the regenerator. Most refiners would prefer to reduce, rather than increase, heat release in their regenerators.

Denox with Coke

U.S. Pat. No. 4,991,521, Green and Yan, showed that a regenerator could be designed so coke on spent FCC catalyst could be used to reduce $NO_x$ emissions from an FCC regenerator. The patent disclosed a two stage FCC regenerator, wherein flue gas from a second stage of regeneration contacted coked catalyst. Although effective at reducing Nox emissions, this approach is not readily adaptable to existing units.

Denox with Reducing Atmospheres

Another process approach to reducing NOx emissions from FCC regenerators is to create a relatively reducing atmosphere in some portion of the regenerator by segregating the CO combustion promoter. Reduction of $NO_x$ emissions in FCC regenerators was achieved in U.S. Pat. Nos. 4,812,430 and 4,812,431 by using a conventional CO combustion promoter (Pt) on an unconventional support which permitted the support to segregate in the regenerator. Use of large, hollow, floating spheres gave a sharp segregation of CO combustion promoter in the regenerator. Disposing the CO combustion promoter on fines, and allowing these fines to segregate near the top of a dense bed, or to be selectively recycled into the dilute phase above a dense bed, was another way to segregate the CO combustion promoter.

Catalytic Approaches to $NO_x$ Control

The work that follows is generally directed at special catalysts which promote CO afterburning, but do not promote formation of as much NOx.

U.S. Pat. Nos. 4,300,997 and 4,350,615, are both directed to use of Pd-Ru CO-combustion promoter. The bimetallic CO combustion promoter is reported to do an adequate job of converting CO to $CO_2$, while minimizing the formation of $NO_x$.

U.S. Pat. No. 4,199,435 suggests steam treating conventional metallic CO combustion promoter to decrease $NO_x$ formation without impairing too much the CO combustion activity of the promoter.

U.S. Pat. No. 4,235,704 suggests too much CO combustion promoter causes $NO_x$ formation, and calls for monitoring the $No_x$ content of the flue gases, and adjusting the concentration of CO combustion promoter in the regenerator based on the amount of $NO_x$ in the flue gas. As an alternative to adding less CO combustion promoter the patentee suggests deactivating it in place, by adding something to deactivate the Pt, such as lead, antimony, arsenic, tin or bismuth.

U.S. Pat. No. 5,002,654, Chin, incorporated by reference, taught the effectiveness of a zinc based additive in reducing $NO_x$. Relatively small amounts of of zinc oxides impregnated on a separate support having little or no cracking activity produced an additive which could circulate with the FCC equilibrium catalyst and reduce $NO_x$ emissions from FCC regenerators.

U.S. Pat. No. 4,988,432 Chin, incorporated by reference, taught the effectiveness of an antimony based additive at reducing $NO_x$.

Metals are poisons to FCC catalyst. Refiners are also reluctant to add more metals to their FCC units out of environmental concerns. One concern is that some additives, such as zinc, may vaporize under some conditions experienced in FCC units. Many refiners are concerned about adding antimony to their FCC catalyst inventory.

Such additives would also add to the cost of the FCC process and would dilute the FCC equilibrium catalyst some.

Considerably effort has been spent on downstream treatment of FCC flue gas. This area will be briefly reviewed.

Stack Gas Treatment

It is known to react $NO_x$ in flue gas with $NH_3$. $NH_3$ is a selective reducing agent, which does not react rapidly with the excess oxygen which may be present in the flue gas. Two types of $NH_3$ process have evolved, thermal and catalytic.

Thermal processes, such as the Exxon Thermal $DENO_x$ process, generally operate as homogeneous gas-phase processes at very high temperatures, typically around 1550°–1900° F. More details of such a process are disclosed by Lyon, R. K., Int. J. Chem. Kinet., 3, 315, 1976, incorporated herein by reference.

The catalytic systems which have been developed operate at much lower temperatures, typically at 300°–850° F. These temperatures are typical of flue gas streams. Unfortunately, the catalysts used in these processes are readily fouled, or the process lines plugged, by catalyst fines which are an integral part of FCC regenerator flue gas.

U.S. Pat. Nos. 4,521,389 and 4,434,147 disclose adding NH3 to $NO_x$-containing flue gas to reduce catalytically the $NO_x$ to nitrogen.

U.S. Pat. No. 5,015,362, Chin, incorporated by reference, taught reducing NOx emissions by contacting flue gas with sponge coke or coal, and a catalyst effective for promoting reduction of $NO_x$ in the presence of such carbonaceous substances.

None of the approaches described above provides the perfect solution.

Feed pretreatment is expensive, and can usually be justified only for sulfur removal. Segregated cracking of feed is a significant benefit, but requires that a refiner have separate high and low nitrogen feeds available.

Process approaches, such as multi-stage or counter-current regenerators, reduce $NO_x$ emissions but require extensive rebuilding of the FCC regenerator.

Various catalytic approaches, e.g., addition of lead or antimony, as taught in U.S. Pat. No. 4,235,704, to degrade the efficiency of the Pt function may help some but still may fail to meet the ever more stringent $NO_x$ emissions limits set by local governing bodies.

Stack gas cleanup methods are powerful, but the capital and operating costs are high.

As can be seen from the above review, there are many problems remaining in FCC catalyst regeneration.

We studied these regenerators, and realized there was a way to make virtues of their defects. The very properties which made them difficult to work with (poor gas contacting, poor catalyst circulation) provided the framework for a better regenerator design. We could make minor equipment modifications to achieve significant process benefits involving essentially no operating expense. We found a way to use productively the poor backmixing characteristics of these regenerators to achieve something approaching co-current gas and catalyst flow. We were also able to reduce $NO_x$ emissions associated with such units.

BRIEF SUMMARY OF THE INVENTION

Accordingly the present invention provides a process for the catalytic cracking of a nitrogen containing hydrocarbon feed to lighter products comprising: cracking said feed by contacting said feed with a supply of hot, regenerated cracking catalyst in a fluidized catalytic cracking (FCC) reactor means operating at catalytic cracking conditions to produce a mixture of cracked products and spent cracking catalyst containing coke and nitrogen compounds and charging said mixture to a separation means; separating said mixture of cracked products and spent cracking catalyst containing coke and nitrogen compounds in said separation means to produce a cracked product vapor phase which is charged to a fractionation means and a spent catalyst phase which is charged to a catalyst stripping means; stripping said spent catalyst in said stripping means to produce a stripped catalyst phase containing coke and nitrogen compounds and charging said stripped catalyst to a regeneration means having a spent catalyst inlet and a regenerated catalyst outlet; charging to said inlet of said dense phase fluidized bed within said regeneration means said stripped catalyst and regenerating said spent catalyst by contact with oxygen or an oxygen-containing gas at dense phase fluidized bed catalyst regeneration conditions, and wherein there is: horizontal flow of catalyst from said spent catalyst inlet to a regenerated catalyst outlet, and vertical flow of regeneration gas from a lower portion of said bed to a dilute phase region above said dense phase bed, to produce at least partially regenerated catalyst in said dense phase fluidized bed which is withdrawn from said dense phase fluidized bed via said catalyst outlet and flue gas with entrained catalyst which is discharged up from said dense phase fluidized bed into a dilute phase region above said dense phase fluidized bed; horizontally transporting, beneath a horizontal baffle means, at least a majority of said dilute phase, comprising flue gas and entrained catalyst, from said bubbling dense phase bed spent catalyst inlet toward said regenerated catalyst outlet.

In another embodiment, the present invention provides a process for the catalytic cracking of a nitrogen containing hydrocarbon feed to lighter products comprising: cracking said feed by contacting said feed with a supply of hot, regenerated cracking catalyst in a fluidized catalytic cracking (FCC) reactor means operating at catalytic cracking conditions to produce a mixture of cracked products and spent cracking catalyst containing coke and nitrogen compounds and charging said mixture to a separation means; separating said mixture of cracked products and spent cracking catalyst containing coke and nitrogen compounds in said separation means to produce a cracked product vapor phase which is charged to a fractionation means and a spent catalyst phase which is charged to a catalyst stripping means; stripping said spent catalyst in said stripping means to produce a stripped catalyst phase containing coke and nitrogen compounds and charging said stripped catalyst to a regeneration means having a spent catalyst inlet and a regenerated catalyst outlet; partially regenerating said spent catalyst in a bubbling dense bed by contact with oxygen or an oxygen-containing gas at dense phase fluidized bed catalyst regeneration conditions sufficient to remove at least 80% of the coke on spent catalyst and produce at least partially regenerated catalyst and flue gas containing oxygen and carbon monoxide gas, and wherein catalyst flows horizontally from said spent catalyst inlet to a spent catalyst outlet and regeneration gas flow is up from a lower portion of said dense bed to a top portion of said dense bed to produce a vertically discharged flue gas comprising entrained catalyst and at least 1.0 mole oxygen and at least 5.0 mole % CO; confining at least a majority of said vertically discharged flue gas within a horizontal baffle no more than 5 feet above the surface of said dense bed and diverting said confined flue gas so that flue gas and entrained catalyst flow is generally co-current with catalyst flow in said dense bed and afterburning said confined flue gas to produce an increase in temperature of at least 10 F within said confined space and produce a dilute phase product comprising a flue gas with a reduced CO content and entrained, heated, regenerated catalyst and discharging at least 50 volume of said confined flue gas near said regenerated catalyst outlet; recovering from cyclone separators within a dilute phase region above said baffle entrained catalyst from flue gas and returning recovered entrained catalyst to said dense bed; and recovering from said regenerated catalyst outlet within said dense bed regenerated catalyst for use in said cracking reactor.

In an apparatus embodiment, the present invention provides an apparatus for the fluidized bed regeneration of fluidized cracking catalyst comprising: a regenerator vessel; a riser reactor having a base inlet for a heavy crackable feed and having an inlet for regenerated catalyst withdrawn from and connected to said regenerator vessel, and an outlet in an upper portion thereof for cracked vapor products and spent catalyst; a reactor vessel connected to said regenerator vessel, receiving and separating said cracked vapor products and spent catalyst discharged from said riser reactor, and having an outlet in an upper portion thereof for vapor and a spent catalyst outlet in a lower portion thereof for spent catalyst; a catalyst stripper, beneath said reactor vessel having an inlet in an upper portion thereof for spent catalyst discharged from said spent catalyst outlet of said reactor vessel, an inlet for stripping gas in a lower portion thereof, and an outlet in a lower portion thereof for stripped catalyst; a stripped catalyst transfer means having an inlet connected to said stripped catalyst outlet of said catalyst stripper and an outlet connected to said regenerator vessel; said catalyst regenerator vessel having: an inlet for spent catalyst connected to said stripped catalyst transfer means, an inlet for regeneration gas in a lower portion thereof, a regenerated catalyst outlet having an elevation, in a lower portion of said regenerator vessel, connected to said inlet for regenerated catalyst of said riser reactor, and a plurality of cyclone separation means having an elevation in an upper portion of said regenerator vessel for receiving flue gas and entrained catalyst discharged up from said lower portion of said vessel, and a horizontal baffle at an elevation between said cyclone inlets and said regenerated catalyst outlet, said baffle covering at least 50% of the horizontal cross sectional area of said regenerator vessel.

DETAILED DESCRIPTION

The process of the present invention is an integral part of the catalytic cracking process. The essential elements of this process will be briefly reviewed in conjunction with a review of FIGS. 1 and 2 (both prior art). Additional details such as FCC reactor systems and spent catalyst strippers are disclosed in most of the patents incorporated by reference. U.S. Pat. No. 3,900,548 shows a swirl regenerator, and how it ties in to an FCC reactor and stripper, and this patent is also incorporated by reference.

Figure 1:
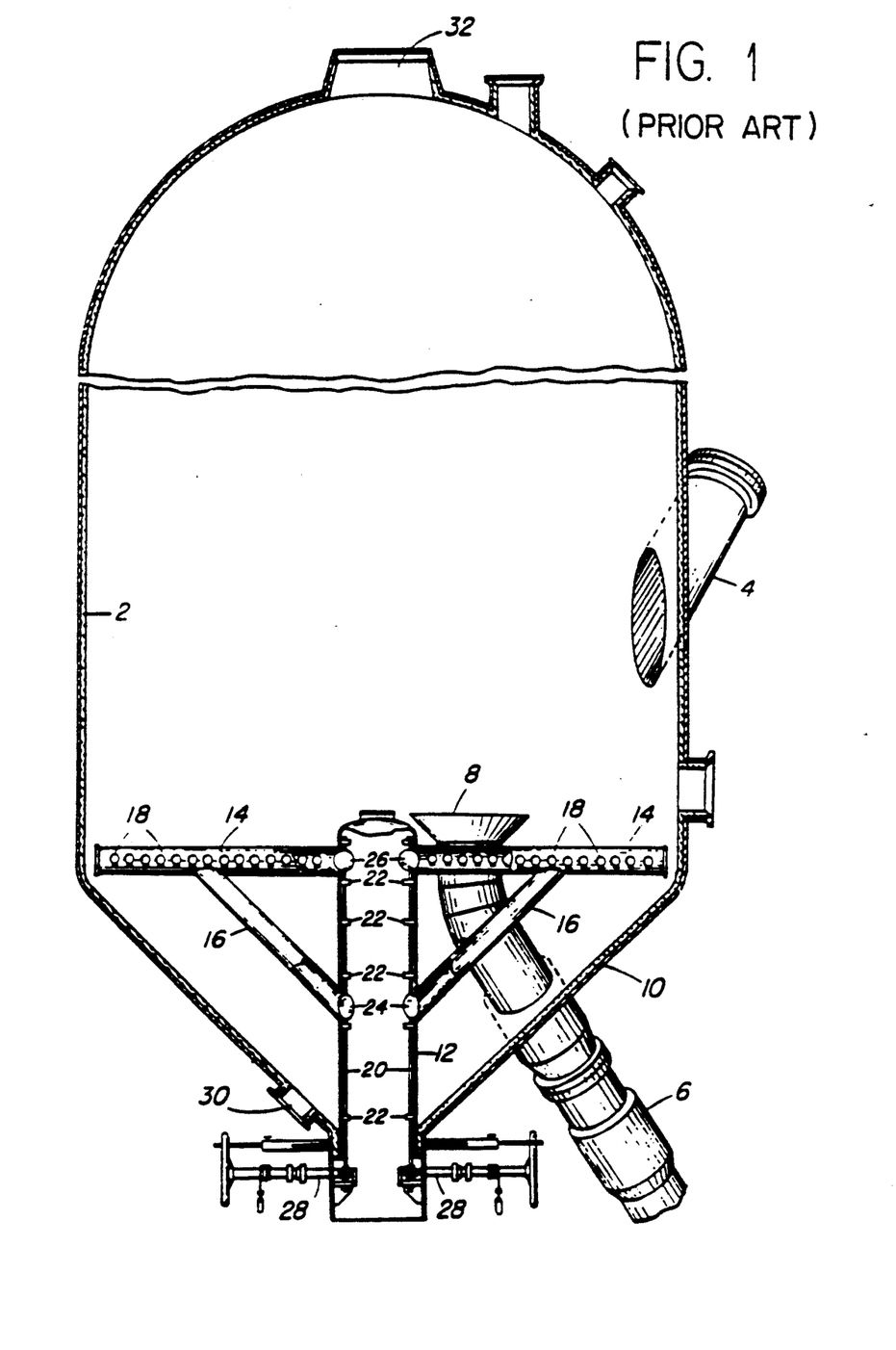
FIG. 1 (prior art) is a simplified, cross-sectional view of a swirl type regenerator, taken from U.S. Pat. No. 4,994,424.

FIG. 1 (Prior Art—from U.S. Pat. No. 4,994,424) shows in elevation a regeneration vessel 2 comprising a regeneration gas distributor means with a flow control valve means. To simplify the drawing, cyclones and diplegs are not shown. A tangential catalyst inlet 4 introduces spent catalyst to vessel 2. Conduit 6 extending up into the vessel and terminating in a funnel shaped mouth 8 above the distributor grid provides means for withdrawing regenerated catalyst. A regeneration gas inlet conduit 12 extends up through the conical bottom 10. A plurality of conduit means 14 extend substantially horizontally outwardly to provide a grid means. Support conduits 16 in open communication with conduits 12 and 14 provide structural support to the grid and distribute regeneration gas. Pipe means 18 extend at right angles to conduits 14. Vertical rods 20 retained by bearings 22 adjacent the inner wall of manifold pipe 12 are provided with disc shape plates 24 and 26 which are valve means for adjusting the flow of gases from manifold 12 into either conduit 14 or 16. The bottom end of each rod is provided with a gear in matching engagement with a work gear on the end of an adjusting rod 28 extending through the wall of inlet pipe 12 external to conical bottom 10. The adjusting rod has a hand wheel on the outside. A covered manhole 30 is provided in the lower portion of the conical bottom 10.

Regeneration gas enters via conduit 12 and passes through conduits 16 and 14 to distributor pipes 18, then passes out through holes along the bottom surface of the pipes and then up through a bed of catalyst to be regenerated under fluid phase regeneration conditions. Regenerated catalyst is withdrawn by conical inlet 8 communicating with conduit 6. Regeneration gas after passing through suitable cyclone separators not shown and positioned in an upper portion of the regenerator passes into a plenum chamber not shown and then out the top of the regenerator vessel as by opening 32.

Figure 2:
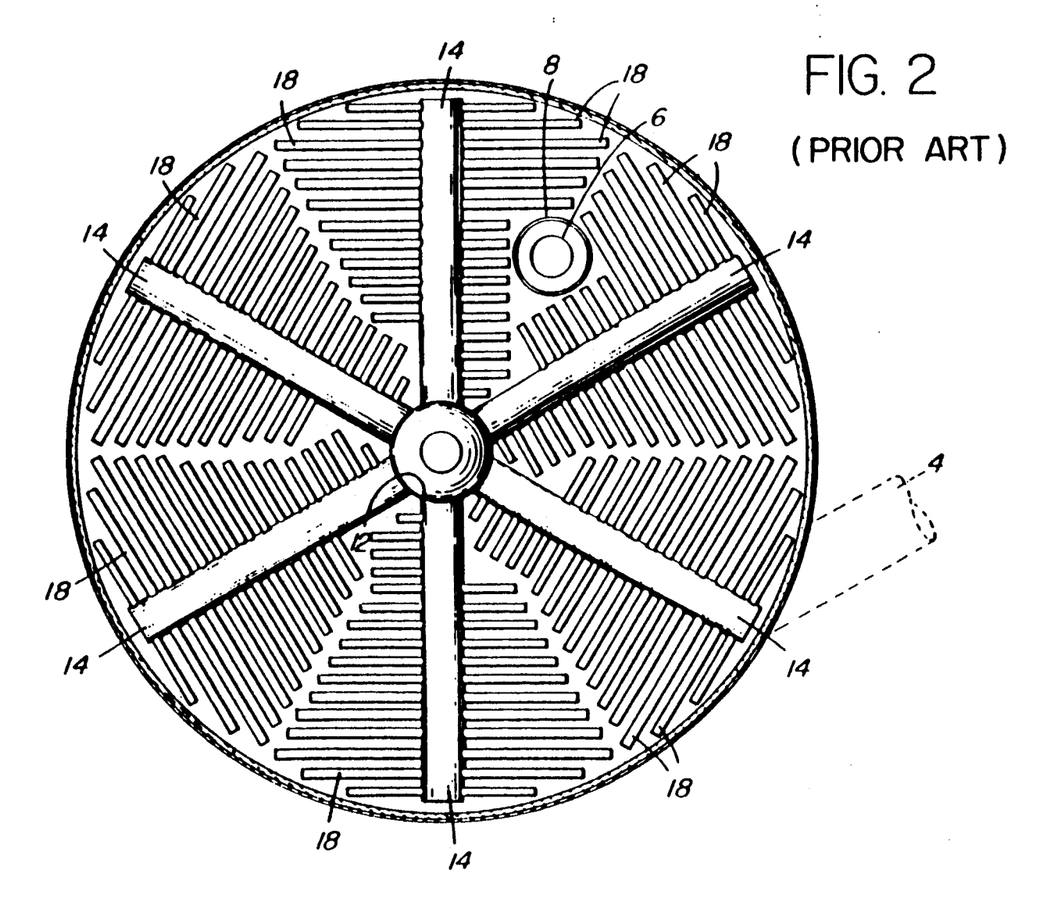
FIG. 2 (prior art) is a cross sectional view of the swirl type regenerator of U.S. Pat. No. 4,994,424.

FIG. 2 shows the segmented regeneration gas distributor grid comprising pipes 18, distributing conduits 14 and concentric regeneration gas inlet conduit 12 which is closed at its upper end positioned within vessel 2. Catalyst withdrawal funnel 8 connected to conduit 6 is shown positioned between two of the segmented distributing grids. The dotted conduit 4 at the side of the drawing is intended to show the relationship of the catalyst inlet conduit 4 to the withdrawal funnel 8.

Figure 3:
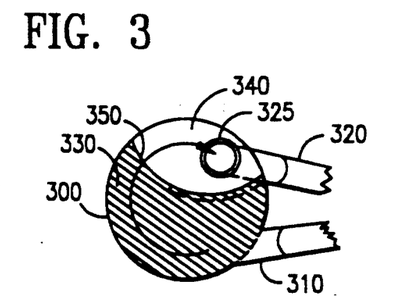
FIG. 3 (invention) shows a very simplified schematic view of a swirl regenerator with a single opening baffle plate.

FIG. 3 shows a swirl regenerator 300 with tangential spent catalyst inlet line 310 and catalyst outlet or bathtub 325 and line 320 connecting to a reactor, not shown. Horizontal baffle plate 330, which is a solid or imperforate plate, extends over most of the swirling dense bed of catalyst maintained within regenerator 300. A large single opening 340, defined by the walls of the regenerator vessel and arc 350 in the baffle, provides a way for entrained catalyst and flue gas discharged from the dense bed to enter the dilute phase region of the regenerator vessel above the catalyst outlet, the region above bathtub 325.

Figure 4:
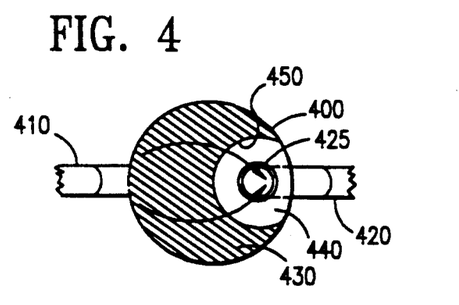
FIG. 4 (invention) shows a cross flow regenerator with a single opening baffle plate.

FIG. 4 shows a cross-flow type regenerator 400. Like elements have been given like numerals, e.g., FIG. 3 shows spent catalyst inlet 310 while FIG. 4 shows spent catalyst inlet 410.

Spent catalyst is added on one side of regenerator 400 by spent catalyst inlet line 410. Regenerated catalyst is withdrawn via line 420. Imperforate baffle plate 430 forces co-current flow of flue gas and entrained catalyst generally toward opening 440 above the bathtub or catalyst outlet 425. The generally circular opening 440 is defined by the walls of the vessel and opening 450 in the baffle plate.

Figure 5:
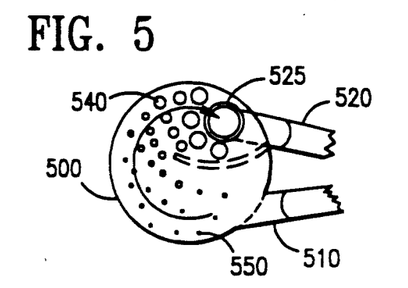
FIG. 5 (invention) shows a swirl regenerator with a perforated plate baffle, with constant hole density and variable hole diameter perforations.

FIG. 5 shows a swirl regenerator with a different type of baffle plate, one that is more or less continuous over the entire lower portion of the regenerator, but with holes 540 through 550 of varying size on a constant pitch. The holes nearest the spent catalyst inlet 510 are relatively small in size, while the holes nearer the outlet 525 are much larger in diameter.

Figure 6:
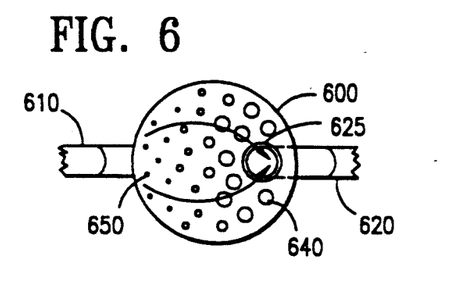
FIG. 6 (invention) shows a cross flow regenerator with a perforated plate baffle, with constant hole density and variable hole diameter perforations.

FIG. 6 shows the concept of constant hole density and variable hole diameter applied to a cross flow regenerator 600. The smallest holes 650 are nearest the spent catalyst inlet 610, while large holes 640 are found near the regenerated catalyst outlet 625.

Figure 7:
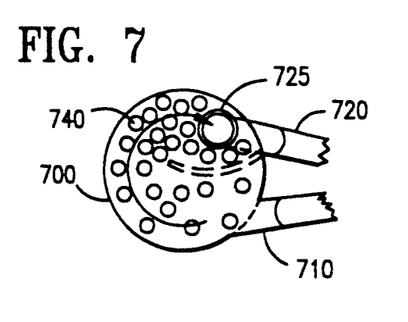
FIG. 7 (invention) shows a swirl regenerator and perforated plate baffle, with constant hole diameter and variable hole density.

FIG. 7 shows another baffle approach, using variable hole density and constant hole diameter, in a swirl regenerator. Relatively few holes 740 are drilled or punched in the baffle plate above the spent catalyst inlet line 710, while hole density increases greatly nearer outlet 720.

Figure 8:
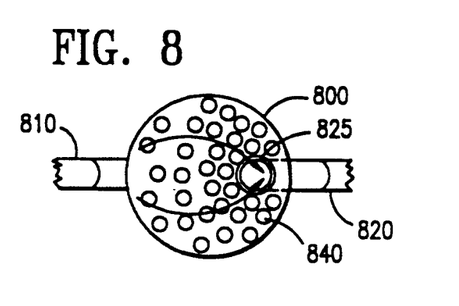
FIG. 8 (invention) shows a cross flow regenerator and perforated plate baffle, with constant hole diameter and variable hole density.

FIG. 8 shows variable hole density and constant hole diameter, applied to a cross flow regenerator. Relatively few holes 840 are provided near spent catalyst inlet line 810, while many more holes are provided near the regenerated catalyst outlet 825.

Figure 9:
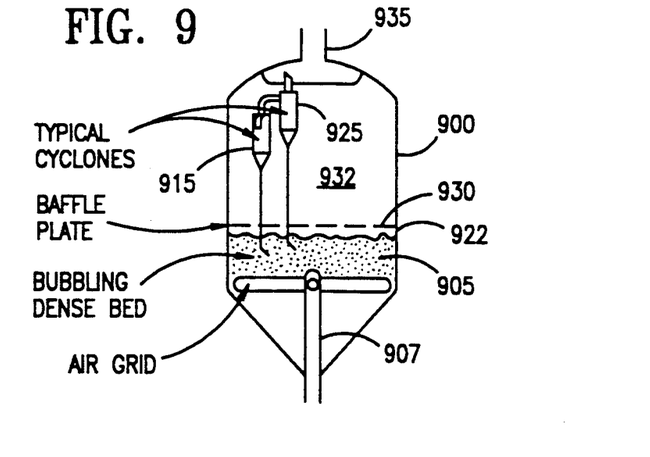
FIG. 9 (invention) shows a side view of a regenerator.

FIG. 9 is a side view applicable to either cross-flow or swirl type regenerators. Spent catalyst is regenerated in bubbling dense bed 905 by addition of regeneration air via air line and air grid 907. Entrained catalyst and flue gas displaced from dense bed 905 pass into the relatively small dilute phase region 922 intermediate the dense bed and the baffle plate 930. Dilute phase region 932 is above the baffle plate. Flue gas passes from dilute phase region 932 to a plurality (usually 6 or 8 or more) of primary cyclones 915, and from there to secondary cyclones 925. Recovered catalyst is recycled to the dense bed via cyclone diplegs, while flue gas is discharged via line 935.

Although not shown in the figures, we prefer to bend the cyclone diplegs so that most of the entrained catalyst is discharged near or into the bathtub.

The present invention is an improvement for use in any catalytic cracking unit which uses a catalyst regenerator operating with a bubbling dense bed. The process and apparatus will be most useful for regenerators operating in full CO combustion mode, but the co-current flow pattern will also be beneficial in regenerators operating in partial CO burn mode (where $NO_x$ emissions are shifted from the regenerator flue gas to the downstream CO boiler).

FCC Feed

Any conventional FCC feed can be used. The process of the present invention is useful for processing nitrogenous charge stocks, those containing more than 500 ppm total nitrogen compounds, and especially useful in processing stocks containing very high levels of nitrogen compounds, such as those with more than 1000 wt ppm total nitrogen compounds.

The feeds may range from the typical, such as petroleum distillated or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650° F.

FCC Catalyst

Commercially available FCC catalysts may be used. The catalyst must contain relatively large amounts of large pore zeolite for maximum effectiveness, but such catalysts are readily available.

Preferred catalysts for use herein will usually contain at least 10 wt % large pore zeolite in a porous refractory matrix such as silica-alumina, clay, or the like. The zeolite content is preferably much higher than this, and should usually be at least 20 wt % large pore zeolite. For optimum results, the catalyst should contain from 30 to 60 wt % large pore zeolite.

All zeolite contents discussed herein refer to the zeolite content of the makeup catalyst, rather than the zeolite content of the equilibrium catalyst, or E-Cat. Much crystallinity is lost in the weeks and months that the catalyst spends in the harsh, steam filled environment of modern FCC regenerators, so the equilibrium catalyst will contain a much lower zeolite content by classical analytic methods. Most refiners usually refer to the zeolite content of their makeup catalyst, and the MAT (Modified Activity Test) or FAI (Fluidized Activity Index) of their equilibrium catalyst, and this specification follows this naming convention.

Conventional zeolites such as X and Y zeolites, or aluminum deficient forms of these zeolites such as dealuminized Y (DEAL Y), ultrastable Y (USY) and ultrahydrophobic Y (UHP Y) may be used as the large pore cracking catalyst. The zeolites may be stabilized with Rare Earths, e.g., 0.1 to 10 wt % RE. Relatively high silica zeolite containing catalysts are preferred for use in the present invention. They withstand the high temperatures usually associated with complete combustion of CO to $CO_2$ within the FCC regenerator. Catalysts containing 30–60% USY or rare earth USY (REUSY) are especially preferred.

The catalyst inventory may also contain one or more additives, either present as separate additive particles, or mixed in with each particle of the cracking catalyst. Additives can be added to enhance octane (medium pore size zeolites, sometimes referred to as shape selective zeolites, i.e., those having a Constraint Index of 1–12, and typified by ZSM-5, and other materials having a similar crystal structure).

The FCC catalyst composition, per se, forms no part of the present invention.

CO Combustion Promoter

Use of a CO combustion promoter in the regenerator or combustion zone is not essential for the practice of the present invention, however, some may be present. These materials are well-known.

U.S. Pat. Nos. 4,072,600 and 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit.

We usually will prefer to operate with modest amounts of CO combustion additive. operation with too much promoter, e.g., 5 or 10 wt ppm Pt (or considerably more or less depending on the unit) can eliminate dilute phase afterburning, which is beneficially used in the process of the present invention to reduce the temperature in the bubbling dense bed.

$SO_x$ Additives

Additives may be used to adsorb $SO_x$. These are believed to be primarily various forms of alumina, rare-earth oxides, and alkaline earth oxides, containing minor amounts of Pt, on the order of 0.1 to 2 ppm Pt. Additives for removal of $SO_x$ are available from several catalyst suppliers, such as Davison's 'RII or Katalistiks International, Inc's 'DESOX."

FCC Reactor Conditions

Conventional riser cracking conditions may be used. Typical riser cracking reaction conditions include catalyst/oil ratios of 0.5:1 to 15:1 and preferably 3:1 to 8:1, and a catalyst contact time of 0.1–50 seconds, and preferably 0.5 to 10 seconds, and most preferably about 0.75 to 5 seconds, and riser top temperatures of 900 to about 1050 F.

Conventional all riser cracking FCC units, such as disclosed in U.S. Pat. No. 4,421,636, incorporated by reference, are preferred.

It is important to have good mixing of feed with catalyst in the base of the riser reactor, using conventional techniques such as adding large amounts of atomizing steam, use of multiple nozzles, use of atomizing nozzles and similar technology.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 4,502,947 to Haddad et al, incorporated by reference.

it is beneficial to strip rapidly the catalyst as it exits the riser, and upstream of the conventional catalyst stripper. stripper cyclones disclosed in U.S. Pat. No. 4,173,527, Schatz and Heffley, incorporated by reference, may be used.

It is preferred, but not essential, to use a hot catalyst stripper. Hot strippers heat spent catalyst by adding some hot, regenerated catalyst to spent catalyst. Suitable hot strippers are shown in U.S. Pat. No. 3,821,103, Owen et al, incorporated by reference. A catalyst cooler may be used to cool the heated catalyst before it is sent to the catalyst regenerator. A preferred hot stripper and catalyst cooler is shown in U.S. Pat. No. 4,820,404, Owen, incorporated by reference.

The FCC reactor and stripper conditions, se, can be conventional.

Catalyst Regeneration

The process and apparatus of the present invention can use conventional fluidized bed FCC regenerators. Most of these comprise a single large vessel, operating with a dense phase, bubbling fluidized bed of catalyst. Some may operate with somewhat higher superficial vapor velocities, and could be characterized as turbulent fluidized beds, but not with velocities which would produce a fast fluidized bed.

The process and apparatus, will be most useful when applied to swirl or cross flow regenerators, or to the regenerators associated with Orthoflow or stacked FCC units.

Swirl regenerators are disclosed in U.S. Pat. Nos. 4,490,241, Chou, and 4,994,424 Leib and Sapre, which are incorporated by reference.

A cross-flow regenerator is disclosed in U.S. Pat. No. 4,980,048 Leib and Sapre, incorporated by reference. A regenerator associated with a stacked or Orthoflow type FCC unit is disclosed in U.S. Pat. Nos. 5,032,252 and 5,043,055 Owen and Schipper, which are incorporated by reference.

Most bubbling dense bed catalyst regenerators operate with large amounts of catalyst, because the regenerators are not very efficient at burning coke. A large catalyst inventory and long residence time in the regenerator are needed for clean burned catalyst. Many units contain several hundred tons of catalyst. Mean catalyst residence time in such regenerators is typically 1–10 minutes, with most having catalyst residence times of 2–3 minutes.

For maximum effectiveness at reducing $NO_x$ emissions, the regenerator should operate with some dilute phase afterburning, at least 10 F, preferably at least 20 F, more preferably at least 25 F and most preferably with 40 to 150 F of afterburning intermediate the bubbling dense bed and the cyclones. The regenerators should maintain complete CO combustion, so at least 90% of the carbon in the flue gas is in the form of $CO_2$ and less than 10% is in the form of CO.

We prefer to operate in substantially complete CO combustion mode. This requires close monitoring of the unit, and control of the amount of CO combustion promoter present. Excess promotion, and reduced or negative temperature rises in the dilute phase should be avoided. In this way the flue gas being discharged to the atmosphere will contain tolerable amounts of CO and NOx. Although this flue gas stream is the one which is regulated, there are actually three flue gas streams which should be considered in the optimum practice of the present invention.

The first stream is the flue gas discharged from the bubbling dense bed. The composition of this gas reflects the combustion kinetics in the dense bed and will be unaltered by the presence of the horizontal baffle. The second stream is the flue gas discharged from the exit side of the horizontal baffle. The composition of this gas will be different from that of the gas exiting the dense bed due to the combustion kinetics occurring in the dilute phase region just below the horizontal baffle. The essential element of the kinetics is that $NO_x$ production is impaired in the presence of CO. Cocurrent flow, in which the continuing combustion proceeds in the presence of combustion products, thus favors lower $NO_x$ formation than the crossflow typical of an unbaffled FCC regenerator. The flue gas discharged from the exit side of the horizontal baffle will reflect the full effect of the present invention. The third gas stream is that entering the regenerator cyclones from the dilute phase, which differs from the gas discharged from the horizontal baffle principally in a lower concentration of oxygen and CO and a higher concentration of $CO_2$, the shift due to afterburning in the dilute phase. The impact of afterburning will be somewhat altered by the present invention because the horizontal baffle will eliminate regions of high oxygen concentration which are known to occur in conventional crossflow and swirl regenerators and which lead to $NO_x$ formation on contact with nitrogenous coke. The present invention thus leads to lower $NO_x$ formation by two separate mechanisms, one operating on the gas beneath the horizontal baffle and the other operating on the gas in transit from the baffle to the cyclones.

At least 90% of the CO formed in the regenerator should be burned to $CO_2$ within the regenerator, so the flue gas contains only limited amounts of CO. The CO content of the flue gas should be below 10 volume %, and is preferably below 1 volume more preferably below 100 ppm and most preferably below 10 ppm.

The oxygen content of the flue gas leaving the regenerator will usually be at most 3 volume %, and preferably at most 2 volume %, more preferably at most 1 volume %, and most preferably at most 0.5 volume %.

The temperature of regenerated catalyst and of flue gas leaving the regenerator will be about the same as in prior art units, however the average bed temperature can be substantially less, because we have more concurrent flow of gas and catalyst across the bubbling dense bed from the catalyst inlet to the catalyst outlet.

The process of the present invention can reduce the bed temperature, while keeping the flue gas and regenerated catalyst temperature up, by forcing the dilute phase afterburning to do some useful work. In the process of the present invention, catalyst and oxygen-containing gas flow cocurrently across the vessel and disengagement of the catalyst and combustion gas is largely restricted by a baffle over the entire vessel area except near the catalyst outlet. Afterburning above the regenerated catalyst Outlet is permitted and encouraged, as is catalyst entrainment into the dilute phase above the outlet. The heat of afterburning is thereby transferred preferentially into catalyst in the dilute phase near the catalyst outlet. If the cyclones discharge recovered catalyst directly down into the bubbling bed, the catalyst recovered from cyclones near the be catalyst outlet will be hotter, and this hotter catalyst will preferentially removed from the regenerator compared to catalyst discharged from cyclone diplegs which are nearer the catalyst inlet.

It is also possible, and will be preferred in many instances, to encourage large amounts of afterburning throughout the entire dilute phase region and selectively discharge all the cyclone diplegs into or near the catalyst outlet, but this is not essential. In some regenerators, it will be difficult to modify the cyclone diplegs in this way, and the present invention does not require it. The baffle above the bubbling dense bed shifts more catalyst into the dilute phase region above the outlet, so any afterburning which occurs in this regin will inherently produce superheated catalyst which will be discharged into a region of the bubbling dense hed fairly near the catalyst outlet.

In most bubbling dense bed regenerators there is sufficient entrainment of catalyst into the dilute phase so every 5 to 50 minutes an amount of catalyst equal to the inventory of catalyst in the bubbling dense bed passes through the cyclones. The process of the present invention will usually increase catalyst traffic in the dilute phase, as the relatively high lateral velocities in the region intermediate the baffle and the bubbling dense bed will sweep more catalyst into the dilute phase region.

Catalyst entrainment in the dilute phase region near the catalyst outlet will be very much somewhat reduced in the designs, while entrainment will be greater than in the prior art dilute phase region above the catalyst inlet.

Discussion

The process of the present invention helps impose co-current flow of gas and catalyst passing through a bubbling dense bed regenerator.

The process of the present invention can be readily used in many existing FCC regenerators with only minor modifications to the unit. The preferred baffle plate is simply a large plate, preferably with some perforate regions. The perforations perform several functions. Every part of an FCC regenerator must be aerated with combustion air or so-me other fluidizing gas. Rather than add extra fluidizing air, or extra combustion air, above the plate it will usually be preferred to let some of the combustion air (or flue gas) from the bubbling dense bed pass through the plate. This transmitted flue gas will serve as 'fluffing air' to keep catalyst which collects on the plate in a fluidized state.

The baffle plate imposes concurrent flow on catalyst and flue gas and entrained catalyst in the dilute phase region above the dense bed. This will not be perfect concurrent flow, as the residence time of the catalyst in the dilute phase will be much less than that of the catalyst in the dense phase. One of the most significant effects will be to eliminate localized dilute phase areas with high oxygen concentrations and significant amounts of nitrogen-containing coke. The dilute phase flue gas will mix very well passing through the dilute phase region before finally leaving via an opening or openings above and in the region of the regenerated catalyst outlet. Just as Richard Wagner specified a recessed orchestra pit, covered with a horizontal plate above much of its surface to allow the sound to blend, our process blends the flue gas before it is discharged into the dilute phase region surrounding the cyclones.

The horizontal baffle plate preferably has fewer, or smaller, holes near the spent catalyst inlet, and more holes or an opening or openings nearer the catalyst outlet.

The horizontal baffle plate can extend across the entire bubbling dense bed, and seal it. This represents one extreme, a horizontal plate covering the entire bubbling dense bed, with graduated perforations, or one or more step changes in perforations or hole size or open area approaching the catalyst outlet. Holes must also be provided for the cyclone diplegs. This approach could be summarized as a completely covering plate, with graduated perforations, slots or openings.

Another extreme is constant perforations, and a partial plate. This involves use of a plate with a constant perforation density, or constant open area, covering at least $\frac{1}{2}$ of the open area above the bubbling dense bed near the catalyst inlet, or above the area through which the entering spent catalyst flows. As applied to a cross flow regenerator, the plate could be a $\frac{1}{2}$ of a circular plate covering the $\frac{1}{2}$ of the bubbling dense bed nearest the spent catalyst inlet. As applied to a swirl regenerator, wherein catalyst flows in a swirl from a tangential, side mounted catalyst inlet to a bathtub catalyst outlet located 250 to 330 degrees around the bed from the inlet, a crescent shaped plate or curved tear drop covering at least $\frac{1}{2}$ or $\frac{3}{4}$ of the bubbling dense bed. In a swirl regenerator with multiple, radially distributed spent catalyst inlets and a central catalyst outlet, a symmetrical plate, having an outer radius equal to the radius of the bubbling dense bed and an inner radius, or open area, equal to $\frac{1}{2}$ of the radius of the bubbling dense bed, could be used.

The plate is not in the bubbling dense bed, and is therefore not subject to as much erosion or wear as would be likely if immersed in the bubbling dense bed. In the preferred embodiment the baffle is located just above the maximum depth of the bubbling dense bed. This is important for long service life, as conditions are severe in FCC regenerators, and it is much easier to design equipment to survive dilute phase conditions than dense phase conditions.

Regardless of plate configuration, it must permit free passage of catalyst recovered from the cyclone diplegs. It is also beneficial if the cyclone diplegs are arranged to discharge preferentially near the catalyst outlet. Such preferential discharge imposes additional co-current regeneration on the catalyst, but the two effects (horizontal plate above the dense bed and segregated discharge of cyclone diplegs) are additive.

It usually will not be possible, or beneficial, to move the cyclones, rather the cyclone diplegs can be angled to discharge directly into, over, or near the regenerated catalyst outlet, so the cyclone diplegs are in fluid communication with the regenerated catalyst outlet and bypass a majority of the bubbling dense bed of catalyst.

Angled cyclone diplegs, passing through somewhat oversized holes cut in the plate to accommodate 16 or 24 etc. cyclone diplegs will work very well. The cyclone diplegs are typically 10 to 20 inches in diameter. Holes roughly twice this diameter will provide ample room for both expansion and gas flow up from the bubbling dense bed. The optimum place to remove flue gas from the dense bed just happens to be the optimum place to return catalyst recovered via the cyclones. There is no need to have a close mechanical fit of cyclone diplegs to horizontal plate; a loose fit simultaneously overcomes severe mechanical constraints of FCC regenerators and provides an optimum path for flue gas removal from the bubbling dense bed.

We claim:

1. A process for the catalytic cracking of a hydrocarbon feed to lighter products comprising:
   a. cracking said feed by contacting said feed with a supply of hot, regenerated cracking catalyst in a fluidized catalytic cracking (FCC) reactor means operating at catalytic cracking conditions to produce a mixture of cracked products and spent cracking catalyst containing coke and charging said mixture to a separation means;
   b. separating said mixture of cracked products and spent cracking catalyst containing coke in said separation means to produce a cracked product vapor phase which is charged to a fractionation means and a spent catalyst phase which is charged to a catalyst stripping means;
   c. stripping said spent catalyst in said stripping means to produce a stripped catalyst phase containing coke and charging said stripped catalyst to a regeneration means having a spent catalyst inlet and a regenerated catalyst outlet;
   d. charging to said inlet of said dense phase fluidized bed within said regeneration means said stripped catalyst and regenerating said spent catalyst by contact with oxygen or an oxygen-containing gas at dense phase fluidized bed catalyst regeneration conditions, and wherein there is:
   horizontal flow of catalyst from said spent catalyst inlet to a regenerated catalyst outlet, and
   vertical flow of regeneration gas from a lower portion of said bed to a dilute phase region above said dense phase bed,
   to produce at least partially regenerated catalyst in said dense phase fluidized bed which is withdrawn from said dense phase fluidized bed via said catalyst outlet and flue gas with entrained catalyst which is discharged up from said dense phase fluidized bed into a dilute phase region above said dense phase fluidized bed;
   e. horizontally transporting, beneath a horizontal baffle means, at least a majority of said dilute phase, comprising flue gas and entrained catalyst, from said bubbling dense phase bed spent catalyst inlet toward said regenerated catalyst outlet.

2. The process of claim 1 wherein said regenerator means is a cross flow regenerator comprising a cylindrical vessel having a horizontal cross sectional area having an inlet on a side portion thereof and an outlet on an opposing side portion thereof, and wherein said horizontal baffle covers 50 to 90% of said cross sectional area of said vessel.

3. the process of claim 1 wheriens aid regenrator is a swirl regenerator comprising a cylndrical vessel having a horizontal cross sectional area, a tangential spent catalyst inlet on a side portion theeof and a regenrated catalysdt outlet at least 270 degrees around said vessel, and where id horizontal baffle covers at least ½ of said cross sectional area of said vessel.

4. The process of claim 1 wherine sid regenrator means is a cylindrical vessel having a cross sectional area and the horizontal baffle covers at least 85 percent of the cross sectional area.

5. The process of claim 1 wheriens aid dilute phase region intermediate said dense phase fluidized bed of aid regneraor and sid horizontal baffle has a height from 0 to 5 feet.

6. The process of claim 1 wherein said dilute phase region inermediate said dense phase fluidized bed of side regenerator and said horizontal baffle has a height from 0.5 to 2 feet.

7. The process of claim 1 wherin said horizontal baffle comprises a perforated plate having a pluralty of openings having a hydraulic or equivalent diameer of 50 to 100 mm and sufficient openings to provide an open area of 10 to 50% of the horizontal cross sectional area of the rgnerator.

8. The process of claim 4 wherien the horizontal baffle plate covers essentially the entire desne phase fluidized bed and wherein:
   half of said plate is on an inlet side of siad regenrator and is closer to siad spent catalyst inlet than said regneratied catalyst outlet, and
   half of said plate is on an outlet side of said regnerator and is closer to sid regenrated catalyst outlet than said spent catalyst inlet; and wherein
   said plate has an open area of no more than 50% of the horizontal cross sectional area of the regenerator on said inlet side, and
   said plate has an open area of at least 20% of the horizontal cross section area of the regenerator on said outlet side.

9. The process of claim 1 wherient he egenrator is a bubbling dense bed regenerator operating at regeneration conditions including:
   a dense phase fluidized ed temperature of 1200 to 1400 F, a horizontal velocity of catlyst from said spent catalyst inlet to said regenerated catalyst outlet from 0.05 to 1 fps, an average residence time of catalyst in said dense phase fluidized bed from 1 to 5 minutes, and superficial vapor velocity up through said bed of 0.5 to 5 fps,
   a horizontal, dilute phase flow of flue gas discharged from said bubbling dense bed under said horizontal baffle toward said regenerated catalyst outlet of 0.05 to 5 fps.

10. The process of claim 1 wherein the regeneration conditions in the region intermediate the dense bed and the horizontal baffle are sufficient to entrain from 10 to 20% of catalyst entering said intermediate region in said dilute phase.

11. A process for the catalytic cracking of a nitrogen containing hydrocarbon feed to lighter products comprising:
   a. cracking said feed by contacting said feed with a supply of hot, regenerated cracking catalyst in a fluidized catalytic cracking (FCC) reactor means operating at catalytic cracking conditions to produce a mixture of cracked products and spent cracking catalyst containing coke and nitrogen compounds and charging said mixture to a separation means;
   b. separating said mixture of cracked products and spent cracking catalyst containing coke and nitrogen compounds in said separation means to produce a cracked product vapor phase which is charged to a fractionation means and a spent catalyst phase which is charged to a catalyst stripping means;
   c. stripping said spent catalyst in said stripping means to produce a stripped catalyst phase containing coke and nitrogen compounds and charging said stripped catalyst to a regeneration means having a spent catalyst inlet and a regenerated catalyst outlet;
   d. partially regenerating said spent catalyst in a bubbling dense bed by contact with oxygen or an oxygen-containing gas at dense phase fluidized bed catalyst regeneration conditions sufficient to remove at least 80% of the coke on spent catalyst and produce at least partially regenerated catalyst and flue gas containing oxygen and carbon monoxide gas, and wherein catalyst flows horizontally from said spent catalyst inlet to a spent catalyst outlet and regeneration gas flow is up from a lower portion of said dense bed to a top portion of said dense bed to produce a vertically discharged flue gas comprising entrained catalyst and at least 1.0 mole oxygen and at least 5.0 mole % CO;
   e. confining at least a majority of said vertically discharged flue gas within a horizontal baffle no more than 5 feet above the surface of said dense bed and diverting said confined flue gas so that flue gas and entrained catalyst flow is generally concurrent with catalyst flow in said dense bed and afterburning said confined flue gas to produce an increase in temperature of at least 10 F within said confined space and produce a dilute phase product comprising a flue gas with a reduced CO content and entrained, heated, regenerated catalyst and discharging at least 50 volume % of said confined flue gas near said regenerated catalyst outlet;
   f. cyclonically separating in cyclone separators having inlet horns within a dilute phase region above said baffle entrained catalyst from flue gas to produce a flue gas stream with a reduced $NO_x$ content as compared to the $NO_x$ content of the flue gas in the absence of said horizontal baffle which is removed from said regenerator and recovered entrained catalyst which is discharged via cyclone diplegs to said dense bed; and
   g. recovering from said regenerated catalyst outlet within said dense bed regenerated catalyst for use in said cracking reactor.

12. The process of claim 11 wherein said regenerator means is a cross flow regenerator comprising a cylindrical vessel having a horizontal cross sectional area having an inlet on a side portion thereof and an outlet on an opposing side portion thereof, and wherein said horizontal baffle covers at least ½ of said cross sectional area of said vessel.

13. The process of claim 11 wherein said regenerator is a swirl regenerator comprising a cylindrical vessel having a orizontal cross sectional area, a tangential spent catalyst inlet on a side ion thereof and a regenerated catalyst outlet at least 270 degree around said vessel, and wherein said horizontal baffle covers at least ½ of said cross sectional area of said vessel.

14. The process of claim 11 wherein said regenerator means is a cylindrical vessel having a cross sectional area and the horizontal baffle covers at least 75 percent of the cross sectional area.

15. Theprocess of claim 11 whereins aid regenerator means is a cylindrical vessel having a cross sectional area and the horizontal baffle covers at least 85 percent of the cross sectional area.

16. Theprocess of claim 11 wherin sid dilute phase region intermdiat said dense phase fluidized bed of said rgenrator and said horizontal baffle has a height from 0.2 to 4 feet.

17. The process of claim 11 wheriens aid dilute phase region intermdediate said dense phase fluidized bed of said regenrator and said horizotnal bafle has a height from 0.5 to 2 feet.

18. The process of claim 11 wheriens aid horizontal baffle comprises a perforated plate having a plurality of openigns having a hydraulic or equivalent diameter of 50 to 100 mm and sufficient openings to provide an open area of 10 to 50% of the horizonal cross section area of the regenrator.

* * * * *

UNITED STATES PATENT AND TRADEMARK OFFICE
CERTIFICATE OF CORRECTION

PATENT NO. : 5,288,397

DATED : February 22, 1994

INVENTOR(S) : Catherine L. Markham et al

It is certified that error appears in the above-identified patent and that said Letters Patent is hereby corrected as shown below:

Abstract, line 13, "Concurrent" should be "Co-current".

Col. 16, lines 8-14, Claim 3 should be rewritten as follows:
--3. The process of claim 1 wherein said regenerator is a swirl regenerator comprising a cylindrical vessel having a horizontal cross sectional area, a tangential spent catalyst inlet on a side portion thereof and a regenerated catalyst outlet at least 270 degrees around said vessel, and wherein said horizontal baffle covers at least 1/2 of said cross sectional area of said vessel. --

Col. 16, line 15, (claim 4), "wherine sid regenrator" should read --wherein said regenerator--.

Col. 16, line 19, (claim 5), "whereins aid" should read --wherein said--.

Col. 16, lines 21-22 (claim 5), "aid regnerator" should read --said regenerator--.

Col. 16, line 21 (claim 5), "sid" should read --said--.
Col. 16, line 24 (claim 6), "inermediate" should be --intermediate--.
Col. 16, line 25 (claim 6), "side" should read --said--.
Col. 16, line 27 (claim 7), "wherin" should read --wherein-- Col. 16, line 28 (claim 7), "pluralty" should read --plurality--.
Col. 16, line 29 (claim 7), "diameer" should read --diameter--.
Col. 16, line 32 (claim 7), "rgnerator" should read --regenerator--.

UNITED STATES PATENT AND TRADEMARK OFFICE
CERTIFICATE OF CORRECTION

PATENT NO. : 5,288,397

DATED : February 22, 1994

INVENTOR(S) : Catherine L. Markham et al

It is certified that error appears in the above-indentified patent and that said Letters Patent is hereby corrected as shown below:

Col. 16, line 33 (claim 8), "wherien" should read --wherein--.
Col. 16, line 34 (claim 8), "desne" should read --dense--
Col. 16, line 36 (claim 8), "siad regenrator" should read --said regenerator--.
Col. 16, line 37 (claim 8), "siad" should read --said--.
Col. 16, line 38 (claim 8), "regneratied" should read --regenerated--.
Col. 16, line 39 (claim 8), "regnerator" should read --regenerator--.
Col. 16, line 40 (claim 8), "sid regenrated" should read --said regenerated--.
Col. 16, line 46 (claim 8), "section" should be --sectional--.
Col. 16, line 48 (claim 9), "wherient he egenrator-- should read --wherein the regenerator--.
Col. 16, line 51 (claim 9), "ed" should be --bed--.
Col. 16, line 52 (claim 9), "catlyst" should be --catalyst--.
Col. 17, line 43 (claim 11), "Concurrent" should be --Co-current--.
Col. 18, line 24 (claim 13), "orizontal" should be --horizontal--.
Col. 18, line 25 (claim 13), "ion" should be --portion--.
Col. 18, line 33 (claim 15), "Theprocess" should be --The process--.
Col. 18, line 37 (claim 16), "wherin sid" should be --wherein said--.
Col. 18, line 38 (claim 16), "intermdiat" should be --intermediate--.
Col. 18, line 39 (claim 16), "rgenrator" should be --regenerator--.

UNITED STATES PATENT AND TRADEMARK OFFICE
CERTIFICATE OF CORRECTION

PATENT NO. : 5,288,397
DATED : February 22, 1994
INVENTOR(S) : Catherine L. Markham et al It is certified that error appears in the above-indentified patent and that said Letters Patent is hereby corrected as shown below:

Col. 18, line 41 (claim 17), "wheriens aid" should be --wherein said--.
    Col. 18, line 42 (claim 17), "intermdediate" should be --intermediate--.
    Col. 18, line 43 (claim 17), "regenrator" should be --regenerator--.
    Col. 18, line 43 (claim 17), "horizotnal bafle" should be --horizontal baffle--.
    Col. 18, line 45 (claim 18), "wheriens aid" should be --wherein said--.
    Col. 18, line 47 (claim 18), "openigns" should be --openings--.
    Col. 18, line 49 (claim 18), "horizonal" should be --horizontal--.
    Col. 18, line 49 (claim 18), "section" should be --sectional--.
    Col. 18, line 50 (claim 18), "regenrator" should be --regenerator--.

Col. 18, line 37 (claim 16), "Theprocess" should be --The process--.
    Col. 18, line 37, (claim 16) "whereins aid" should be --wherein said--.

Signed and Sealed this

Twentieth Day of September, 1994

Attest:

BRUCE LEHMAN

Attesting Officer      Commissioner of Patents and Trademarks